United States Patent [19]
Bennett et al.

[11] Patent Number: 5,175,645
[45] Date of Patent: Dec. 29, 1992

[54] THREE PANEL REFLECTOR

[76] Inventors: Reginald B. Bennett, 3103 Seneca Drive, Oakville, Canada, L6L 1B1; Reginald S. Bennett, 44 Charles Street West, Suite 4408, P.O. Box 247, Station 'F', Toronto, Ontario, Canada, M4Y 2L5

[21] Appl. No.: 802,195

[22] Filed: Dec. 4, 1991

[51] Int. Cl.⁵ .............................................. G02B 5/122
[52] U.S. Cl. .................... 359/530; 359/515; 359/546; 356/138
[58] Field of Search .............. 359/529, 531, 546, 551, 359/553, 515, 854, 855, 861; 356/138, 399

[56] References Cited

U.S. PATENT DOCUMENTS

| | | | |
|---|---|---|---|
| 3,458,245 | 7/1969 | Stanley | 359/533 |
| 3,873,210 | 3/1975 | Konopka | 356/138 |
| 4,560,236 | 12/1985 | Clarke | 359/529 |
| 5,022,739 | 6/1991 | Bennet et al. | 359/546 |

*Primary Examiner*—Bruce Y. Arnold
*Assistant Examiner*—James Phan

[57] ABSTRACT

A reflector has 3 planar reflecting surfaces with the upper and lower surfaces each intersecting the central plane at an angle between 145° and 150°, each reflecting surface being composed of individually imperceptible cube corner reflectors.

18 Claims, 2 Drawing Sheets

THREE PANEL REFLECTOR

This invention relates to a reflector designed to assist in defining the descent path for aircraft or helicopters when in the process of landing.

By 'aircraft' herein I mean fixed wing aircraft.

There is a considerable need for a cheap and efficient aircraft descent path indicator for remote runways which may be located in areas without a practically available source of power. Such a cheap and efficient descent path indicator may be also required as back up, for use on a normally lighted runway, in case of power failure. There is an analogous need for a helicopter descent path indicator.

The reflector in accord with the invention uses some qualities of cube corner retroreflector arrays not previously known.

By retroreflector I mean a reflector where a large proportion (but not all) incident rays are reflected back to the incident ray source.

U.S. Pat. No. 5,022,739 dated Jun. 11, 1991 discloses a descent path indicator comprised of two planar reflecting surfaces at 60° to each other each reflecting surface being an array of cube corner retroreflectors small enough that the reflectors are not individually resolvable at minimum normal viewing distances. When the plane of symmetry of the reflector slopes at the desired descent angle, incident rays from a descending aircraft, on the descent path, are retroreflected at an angle of 60° to the normal to the respective reflector planes. Although good results have been obtained with such a descent path indicator I have found that better results are obtained with the descent path indicator of this invention.

In accord with this invention the descent path indicator utilizes three substantially retroreflecting surfaces being a central planar surface and upper and lower planar surfaces. The upper and lower planar surfaces each intersect the central plane at 145°-150° along the upper and lower edges of the central plane.

Each reflecting planar surface is covered by an array of cube corner reflectors too small to be individually resolvable at minimum normal viewing distances. The central reflecting plane is, in use, oriented to be normal to the desired descent path for the aircraft or helicopter.

Thus the pilot of an aircraft or helicopter, on the descent path and carrying a searchlight or landing lights will receive a retroreflection at 90° to the surface of the central plane and at 35°-30° to the normal along the upper and lower planes. It is found that the reflection from the central plane plus reflection at 30° to the normal of the upper and lower planes gives a very good indication to a pilot on the descent path, that he is on the right path. Some degradation is experienced when the retroreflection from the upper and lower planes increases from 30° beyond 35° to the respective normals to those planes although good results are still achieved.

In one preferred embodiment of the invention the upper and lower planes are at substantially 150° to the central plane to give a very bright reflection on the flight path.

In another preferred embodiment of the invention the upper and lower planes are at substantially 146° to the central plane to give a bright reflection on the flight path but with the added feature that a pilot descending and near to but below the flight path will receive a bright retroreflector from the upper planar retroreflector and a darkened retroreflection from the lower planar retroreflector. For a pilot near to but above the flight path the darkness and brightness of the upper and lower plane retroreflections is reversed. Thus the pilot may achieve the correct flight path by altering his descent angle toward whichever of the upper or lower reflectors is brighter.

With the comments of the last paragraph in mind the most preferred form of the descent path indicate uses a central planar retroreflector for orientation normal to the descent, path, a lower planar retroreflector at an angle between 145° and 147° thereto and an upper planar reflector at 150° thereto. The result is a reflector where a bright retroreflection is received from all three planes to a pilot on the flight path whereas a pilot near to but below the flight path sees the lower reflector as noticeably darker indicating that he should alter, in an upward sense, the descent direction. It is preferred as a precautionary measure not to provide the reverse result.

In all variants it is preferred to make the upper and lower retroreflectors in a (reflecting) color contrasting with that of the central reflector. This combined with the preferred form of the retroreflectors as rectangles with their long dimension parallel to the planar lines of intersection provides that the three 'bars' of the retroreflectors provide an artificial horizon to assist the pilot in keeping his aircraft or helicopter level.

The usual descent angle for an aircraft is 2°-6° and for a helicopter 8°-10°.

In a preferred aspect of the invention the panels carrying the reflectant material, (and preferably the whole marker (other than the reflecting layers)) are made of aluminum. Although many of the advantages of aluminum are well known, a particular advantage with this invention is that aluminum has nearly the same coefficient of thermal expansion as the preferred retroreflectant material which is preferably applied as a layer to the panel. Considering the fact that the reflector in accord with the invention should be designed to withstand a temperature range of −40° C. to +50° C., the effects of differential thermal expansion between the body of the reflector and the reflectant surface are material and in many situations, the use of aluminum (which term includes aluminum alloys) is found the best way to avoid buckling or tearing of the retroreflectant material, since the thermal expansion coefficient of aluminum or aluminum alloys is close to that of the preferred retroreflectant material.

By 'aluminum' hereafter, including the claims, I mean to include aluminum alloys.

In drawings which illustrate a preferred embodiment of the invention:

Figure 1:
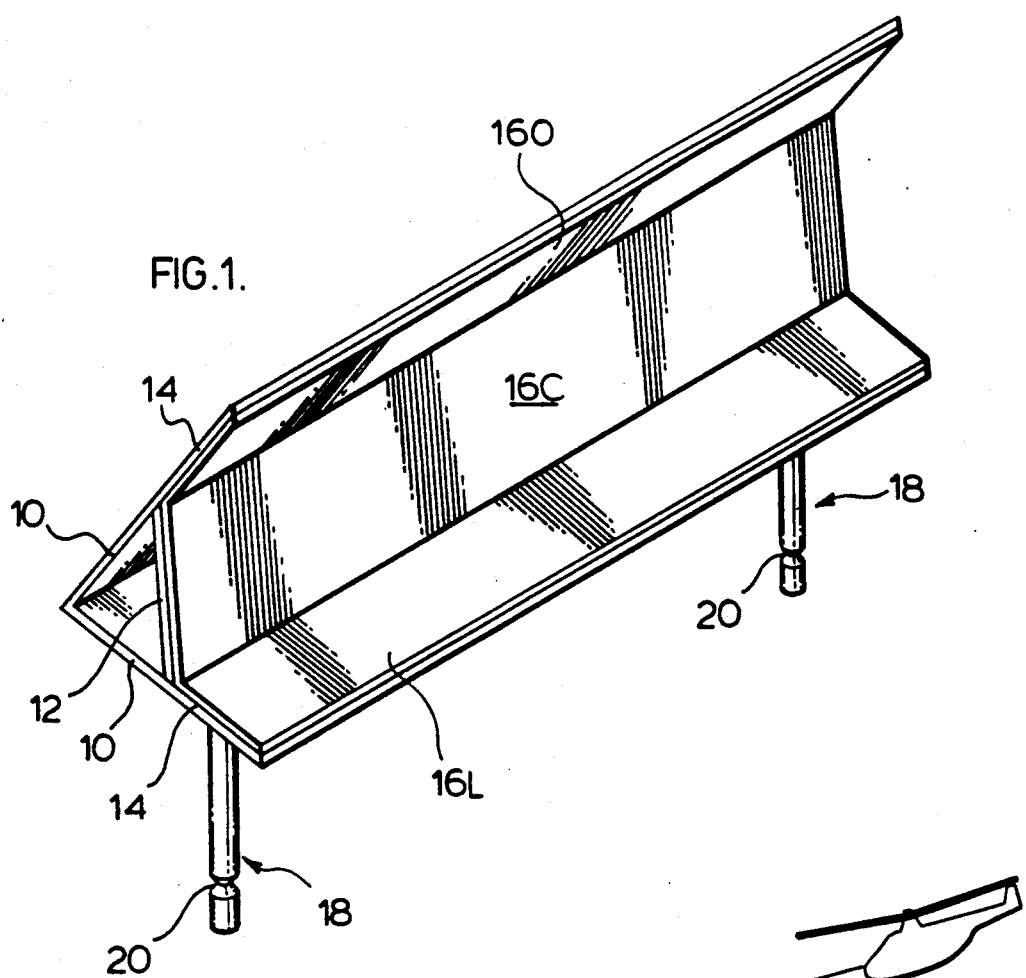
FIG. 1 is a perspective view of a reflector in accord with the invention.
Figure 2:
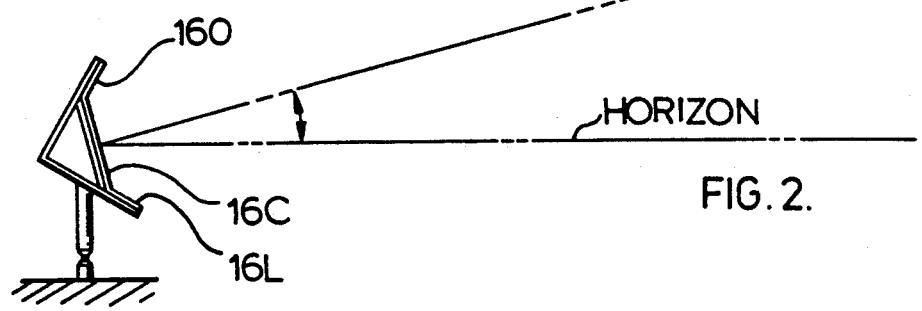
FIG. 2 is a side view of the reflector with anchored supports with a schematically indicated glide path.
Figure 3:
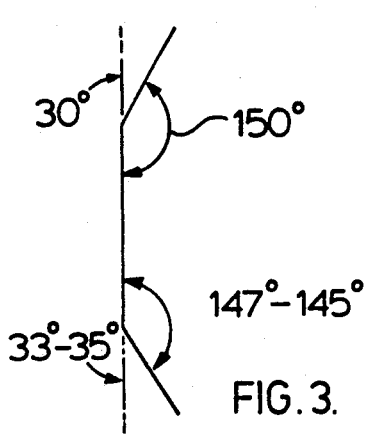
FIG. 3 is a schematic indication of the relationship of the planes in the most preferred embodiment of the invention.

In the drawings FIG. 1 shows backing sheets of aluminum 10 intersecting at an angle about between 115° and 117° (see FIG. 3) with a bridging sheet of aluminum 12 making an angle of about 150° with the upper sheet 10 and about between 145° and 147° with the lower sheet 10 and so that the sheet 12 and the two portions 14 of sheets 10 forward of sheet 12 define three planar rectangular surfaces with the long dimension parallel to the lines of intersection of the planes represented by sheets 10 and 12. The cube corner retroreflector material 16U, 16C, 16L is customarily supplied by self adhesive layers which are applied to the front of portions 14 and the front of sheet 12. Preferably the retroreflective layers 16U, 16L on the one hand contrast with the retroreflectant portions 16C on the other hand. I prefer to use yellow retroreflectant layers at 16U, 16L and white at 16L. The contrasting areas in addition to being retroreflectant provide an artificial horizon for the pilot.

The reflector is mounted on a stand, here comprising standards 18 which would be anchored in the ground and oriented to coincide with the desired descent path to the runway for an aircraft or to the desired descent path to a landing pad for a helicopter. The narrowed portions 20 may be provided to make the reflector easily frangible in case of aircraft or helicopter impact. The support may of course be of any complexity or sophistication.

The reflector will be mounted on the support to have the normal to the plane of central panel 16C aligned with the descent path in azimuth and in elevation the normal corresponds to the desired descent path for helicopters, or for aircraft.

Thus a helicopter or aircraft approaching on the desired flight path will receive a retroreflection from all three retroreflectors 16U, 16C, 16L and the retroreflection will be brighter than that obtained with the reflector of U.S. Pat. No. 5,022,739. However an helicopter or aircraft below the flight path will be projecting an incident ray at greater than 35° to the normal to area 16L. The retroreflection will be sufficiently degraded as to make the area of 16L look dimmer to the pilot, indicating that he should raise the angle of descent until he reaches the flight path at which lower area 16L will again become bright—so that with all three areas bright he realizes that he is on the correct path.

(The discussion assumes that, in addition to the inventive reflector acting as a guide there will be additional reflectors (of another type) (not shown) indicating the azimuthal direction of the runway or the location of a helicopter launching pad.

Figure 4:
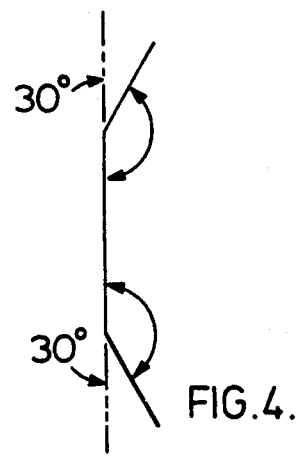
FIG. 4 is a schematic indication of the relationship of the planes in an alternative embodiment of the invention.

In FIG. 4 the alternative shown has both retroreflectors 16U and 16L at about 150° to the central retroreflector 16C. The device is brighter than that of U.S. Pat. No. 5,022,739 but does not, to the same degree, warn the pilot when he is below the flight path.

Not shown is the alternative when both panels 16U and 16L make an angle of about between 145° and 147° to central panel 16C with an indication to the pilot that he is above or below the flight path.

Typical dimensions of the rectangular panels are:

| 16U | length | 48" | width | 18" |
| 16C | length | 48" | width | 6" |
| 16L | length | 48" | width | 18" |

I prefer to use a plastic provided with an aluminized coated surface shaped to define an array of recessed cube corners. Retroreflection is strongest when the incident (and hence the reflected) beam are normal to the surface. Thus the pilot, of a descending aircraft, may tell when he is on the correct descent path by the fact that the retroreflection from a panel becomes brighter or less bright as he approaches or departs from the descent angle normal to the panel. As stated herein this invention takes advantage of the fact that retroreflection of incident light at about 30° to the normal to the reflector plane is stronger than at other non-normal angles.

I prefer to use a cube corner recessed retroreflector formed of plastic with the cube corner recesses molded in a selectively colored aluminized reflector coating on the outer cube surface. And with the colors of surfaces 16U, 16L differing from the color of 16C. In the preferred form of such material the recessed cube surfaces are covered with a protective transparent smooth layer (not shown) also of plastic to protect and keep clean the recessed cube corners.

As the retroreflectant material I prefer to use surfaces made up of the cube corner reflectors as described in the following U.S. Patents:

| | |
|---|---|
| 2,380,447 | Jungerson |
| 3,712,706 | Stamm |
| 3,684,348 | Rowland |
| 3,810,804 | Rowland |
| 4,025,159 | |
| 4,202,600 | Burke |

The teachings of the above patents are incorporated herein by reference.

In particular the invention preferably makes use of cube corner reflective sheeting as described in the Burke U.S. Pat. No. 4,202,600 where regular arrays of cube corner reflectors in sheets are arranged in zones (indistinguishable to the user) are oriented relative to adjacent zones in such a way that retroreflective intensity variation with azimuthal angle (measured in the plane of the sheet), is reduced at high angles of incidence to the normal to the sheet.

By an array is meant an ordered group of cube corner triads. A 'zone' is the area occupied by such an array.

The invention takes advantage of the fact that retroreflectant material composed of arrays of cube corner reflectors (which are not individually distinguishable at minimum expected viewing distances) customarily retroreflect incident light more strongly at a normal angle of incidence than at any other angle of incidence and that there is a secondary retroreflection at an angle of about 30° to the normal to the reflector plane reflect more strongly than at other non-normal incident angles.

It is noted that with all cube corner reflector arrays there is some directivity in the strength of the secondary reflection. That is for a given array zone the secondary reflection will be stronger in some azimuthal directions relative to the normal than other. It will also be noted that the cube corner reflector array zones which are taught by U.S. Pat. No. 4,202,600 and preferred for use with the invention, are too small for resolution by the viewer so that the actual orientation of individual zones of the reflecting coating is applied cannot be detected at minimum expected viewing distances. Thus it is preferable if the cube corner reflector sheet is divided into zones (indistinguishable at expected minimum viewing distances) which are differently oriented relative to each other tending to give a more uniform reflection at large angles to the normal and at varying azimuthal angles about the normal.

Preferably the cube corner cavity material is that sold under the trade mark REFLEXITE, a product of the Reflexite Corporation of New Britain, Conn. In such product the cube corner cavities are arranged in windows formed by triads of mutually perpendicular cube faces in an ordered array with a predetermined orientation. Such ordered arrays are in zones small enough to be indistinguishable to the viewer at minimum normal viewing distances. The zones are preferably arranged to have two orientations at 90° to each other arranged in a checkerboard or other pattern. The REFLEXITE material customarily is supplied in rolls with a self adherent backing.

Figure 5:
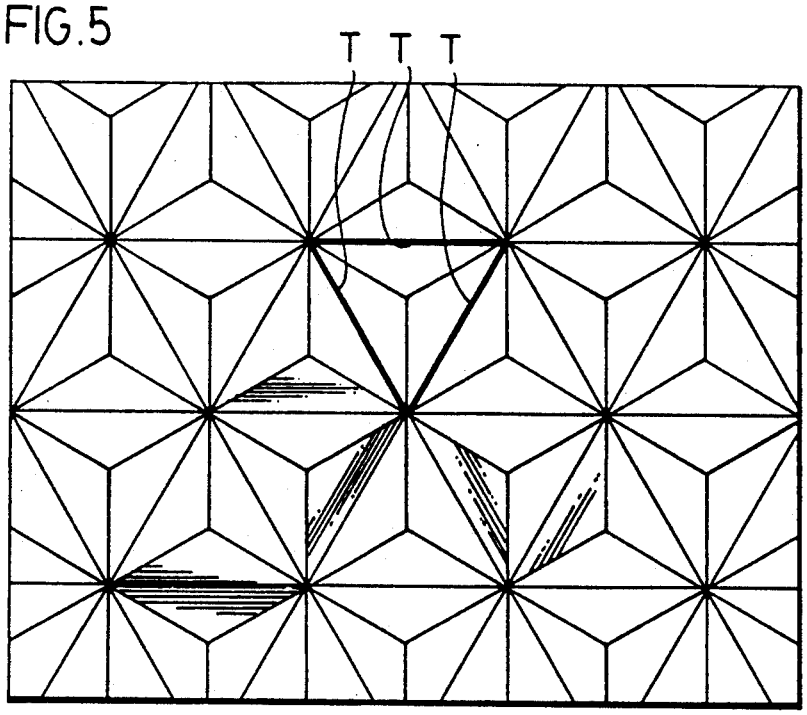
FIGS. 5-7 show preferred retroreflectant material.
Figure 6:
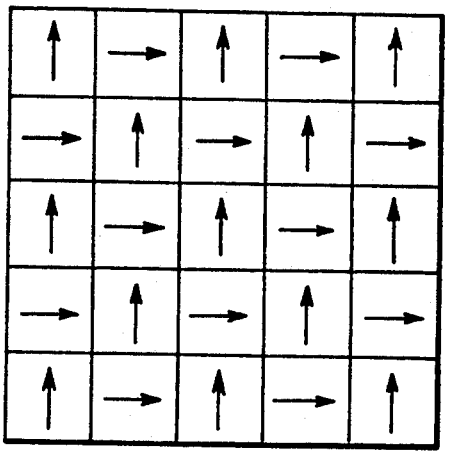
Figure 7:
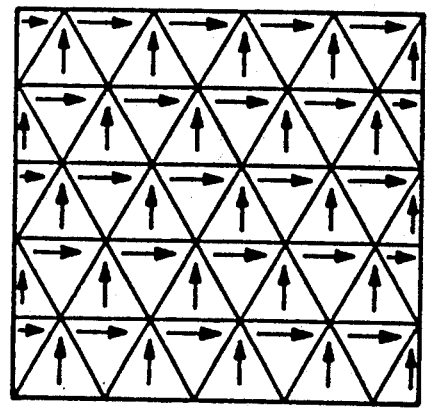

FIGS. 5-7 are taken from U.S. Pat. No. 2,202,600 previously referred to. In FIG. 5 the preferred retroreflective sheeting is schematically illustrated from the non-retroreflecting side. The array as oriented in FIG. 6 may be thought of as having an orientation corresponding to a horizontal directional arrow. As stated in U.S. Pat. No. 4,202,600 the orientation of an array with an orientation as shown in FIG. 6 can be varied in a regularly alternating pattern, such as a checkerboard pattern, in a random pattern or in any other pattern that provides sufficient mixing of different orientations to give the sheet an appearance of uniform brightness when viewed at a high angle of incidence from the minimum.

FIGS. 6 and 7 show two preferred methods of combining arrays in zones with orientations at 90° to each other. Since the arrays have 60° symmetry (90°−60°=30°) each zone has its cube corner reflectors oriented at 30° to adjacent zones. The result is reflective sheeting which for retroreflected rays at 60° or 30° to the normal, has relatively even reflectivity at different azimuthal angles about the normal.

As previously stated the preferred sheeting of the Reflexite Corporation of New Britain Conn. The zones are indistinguishable at normal minimum viewing distance.

It is noted that the two qualities of the preferred material which are of principal value with this invention, are that the night retroreflection at relatively wide angles to the normal to the plane allows the pilot, at night, to find the general location of the runway and its markers, while the stronger retroreflection when the pilot is on his correct descent path acts as an indicator to help him to reach and maintain the correct descent path.

The preferred retroreflecting material is customarily supplied in rolls, from which the layers 16U, 16C, 16L may be cut for adhesive application to panels 12 or portions 14; to form, as shaped by the planar panels, rectangular retroreflecting areas 16U, 16C, 16L with their long dimension parallel to the lines of intersection of the planes. The reflector of the invention will be principally used at night and I prefer to use retroreflecting material of white and yellow as previously discussed.

Since the reflector should be designed to operate over a temperature range of −50° C. to 40° C., it is of some importance that the thermal expansion coefficient of the retroreflectant layer be close to that of the panels 10. With the preferred retroreflecting material as described above the planar panel is preferably made of aluminum since its coefficient of thermal expansion is sufficiently close to that of the preferred "Reflexite" as to prevent, in most circumstances, the buckling or tearing of the 'Reflexite' over the above temperature range.

In this embodiment it is preferred to make the backing device for the reflecting layer or layers of aluminum sheets, assembled as shown and each of sufficient thickness to sustain its shape.

I claim:

1. A reflector comprising means for supporting three substantially planar reflecting surfaces including a central planar surface and upper and lower planar surfaces each intersecting the central plane at an angle between 145° and 150° along the respective upper and lower edges of the central planar surface, each said reflecting surface comprising an array of cube corner reflectors; said reflectors being too small for individual resolution at minimum normal viewing distances.

2. The reflector as claimed in claim 1 wherein said planar surfaces are generally rectangular with the long dimension extending parallel to the lines of intersection of the planes.

3. The reflector as claimed in claim 2 where adjacent planar surfaces are differently colored.

4. The reflector as claimed in claim 3 in combination with means for supporting said reflector with the lines of intersection of said planes running substantially horizontally and said central planar surface oriented so that its normal slopes at an angle between 2° and 6° above the horizontal.

5. The reflector claimed in claim 3 in combination with means for supporting said reflector with the lines of intersection of said planes running substantially horizontally and said central planar surface oriented so that its normal slopes at an angle between 8° and 10° above the horizontal.

6. The reflector as claimed in claim 2 wherein the upper planar surface intersects the central planar surface at an angle of about 150° and the lower planar surface intersect the central plane at an angle about between 145° and 147°.

7. The reflector as claimed in claim 6 in combination with means for supporting said reflector with the lines of intersection of said plane running substantially horizontally and said central planar surface oriented so that its normal slopes at an angle between 2° and 6° above the horizontal.

8. The reflector as claimed in claim 6 in combination with means for supporting said reflector with the lines of intersection of said planes running substantially horizontally and said central planar surface oriented so that its normal slopes at an angle between 8° and 10° above the horizontal.

9. The reflector as claimed in claim 2 in combination with means for supporting said reflector with the lines of intersection of said planes running substantially horizontally and said central planar surface oriented so that its normal slopes at an angle between 2° and 6° above the horizontal.

10. The reflector as claimed in claim 2 in combination with means for supporting said reflector with the lines of intersection of said planes running substantially horizontally and said central planar surface oriented so that its normal slopes at an angle between 8° and 10° above the horizontal.

11. The reflector as claimed in claim 1 where adjacent planar surfaces are differently colored.

12. The reflector as claimed in claim 11 in combination with means for supporting said reflector with the lines of intersection of said planes running substantially horizontally and said central planar surface oriented so that its normal slopes at an angle between 2° and 6° above the horizontal.

13. The reflector as claimed in claim 11 in combination with means for supporting said reflector with the lines of intersection of said planes running substantially horizontally and said central planar surface oriented so that its normal slopes at an angle between 8° and 10° above the horizontal.

14. The reflector as claimed in claim 1 wherein the upper planar surface intersects the central planar surface at an angle of about 150° and the lower planar surface intersects the central plane at an angle about between 145° and 147°.

15. The reflector as claimed in claim 14 in combination with means for supporting said reflector with the lines of intersection of said planes running substantially horizontally and said central planar surface oriented so that its normal slopes at an angle between 2° and 6° above the horizontal.

16. The reflector as claimed in claim 14 in combination with means for supporting said reflector with the lines of intersection of said planes running substantially horizontally and said central planar surface oriented so that its normal slopes at an angle between 8° and 10° above the horizontal.

17. The reflector as claimed in claim 1 in combination with means for supporting said reflector with the lines of intersection of said planes running substantially horizontally and said central planar surface oriented so that its normal slopes at an angle between 2° and 6° above the horizontal.

18. The reflector as claimed in claim 1 in combination with means for supporting said reflector with the lines of intersection of said planes running substantially horizontally and said central planar surface oriented so that its normal slopes at an angle between 8° and 10° above the horizontal.

* * * * *